(12) United States Patent
Koizumi

(10) Patent No.: US 11,630,891 B2
(45) Date of Patent: Apr. 18, 2023

(54) IMAGE PROCESSING APPARATUS WITH BIOMETRIC AUTHENTICATION AND BIOMETRIC AUTHENTICATION METHOD FOR IMAGE PROCESSING APPARATUSES

(71) Applicant: TOSHIBA TEC KABUSHIKI KAISHA, Tokyo (JP)

(72) Inventor: Shinji Koizumi, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 248 days.

(21) Appl. No.: 17/021,436

(22) Filed: Sep. 15, 2020

(65) Prior Publication Data

US 2021/0192029 A1 Jun. 24, 2021

(30) Foreign Application Priority Data

Dec. 20, 2019 (JP) .............................. JP2019-230416

(51) Int. Cl.
*G06F 21/32* (2013.01)
*G06F 3/12* (2006.01)

(52) U.S. Cl.
CPC ............ *G06F 21/32* (2013.01); *G06F 3/1222* (2013.01); *G06F 3/1238* (2013.01); *G06F 3/1257* (2013.01); *G06F 3/1263* (2013.01); *G06F 3/1284* (2013.01)

(58) Field of Classification Search
CPC ...... G06F 21/32; G06F 3/1222; G06F 3/1238; G06F 3/1257; G06F 3/1263; G06F 3/1284
See application file for complete search history.

(56) References Cited

U.S. PATENT DOCUMENTS

2017/0371606 A1* 12/2017 Saka ...................... G06V 40/10

FOREIGN PATENT DOCUMENTS

| JP | 2005149344 A | * | 6/2005 |
| JP | 2018134745 A | | 8/2018 |

OTHER PUBLICATIONS

English translation of Japanese Application 2003-388819, corresponding to Japanese Application Publication 2005-149344. (Year: 2003).*

* cited by examiner

*Primary Examiner* — Thomas D Lee
(74) *Attorney, Agent, or Firm* — Kim & Stewart LLP

(57) ABSTRACT

An image processing apparatus of one embodiment includes an image processing unit and a controller. The controller receives biometric information for a user for a logon operation and re-orders user record entries in a table when a predetermined condition occurs. Each record entry in the table includes reference biometric information in association with user information. The re-ordering of the entries is based on user information stored in the user record entries. After the re-ordering of the user record entries in the table, the controller performs an authentication operation that includes comparing the received biometric information to reference biometric information in the re-ordered user record entries of the table until a match is determined.

20 Claims, 11 Drawing Sheets

| USER IDENTIFICATION | FINGERPRINT | LAST UPDATE | LAST LOGIN | LOGIN COUNT |
|---|---|---|---|---|
| Oda | biodata0001.* | 2019/2/1 8:36 | 2019/7/1 13:07 | 20 |
| Toyotomi | biodata0002.* | 2019/2/1 8:44 | 2019/6/30 14:27 | 16 |
| Tokugawa | biodata0003.* | 2019/2/1 10:10 | 2019/7/10 17:05 | 22 |
| Sakamoto | biodata0004.* | 2019/2/4 18:01 | 2019/7/2 20:43 | 19 |
| Ookubo | biodata0005.* | 2019/2/5 19:21 | 2019/7/10 8:11 | 41 |
| Saigo | biodata0006.* | 2019/2/7 8:12 | 2019/7/9 16:40 | 55 |
| Ito | biodata0007.* | 2019/2/7 12:36 | 2019/7/1 9:35 | 12 |
| Yoshida | biodata0008.* | 2019/2/7 13:59 | 2019/7/4 16:19 | 17 |

| USER IDENTIFICATION | FINGERPRINT | LAST UPDATE | LAST LOGIN | LOGIN COUNT |
|---|---|---|---|---|
| Tokugawa | biodata0003.* | 2019/2/1 10:10 | 2019/7/10 17:05 | 22 |
| Ookubo | biodata0005.* | 2019/2/5 19:21 | 2019/7/10 8:11 | 41 |
| Saigo | biodata0006.* | 2019/2/7 8:12 | 2019/7/9 16:40 | 55 |
| Yoshida | biodata0008.* | 2019/2/7 13:59 | 2019/7/4 16:19 | 17 |
| Sakamoto | biodata0004.* | 2019/2/4 18:01 | 2019/7/2 20:43 | 19 |
| Oda | biodata0001.* | 2019/2/1 8:36 | 2019/7/1 13:07 | 20 |
| Ito | biodata0007.* | 2019/2/7 12:36 | 2019/7/1 9:35 | 12 |
| Toyotomi | biodata0002.* | 2019/2/1 8:44 | 2019/6/30 14:27 | 16 |

| USER IDENTIFI-CATION | FINGERPRINT | LAST UPDATE | LAST LOGIN | LOGIN COUNT |
|---|---|---|---|---|
| Saigo | biodata0006.* | 2019/2/7 8:12 | 2019/7/9 16:40 | 55 |
| Ookubo | biodata0005.* | 2019/2/5 19:21 | 2019/7/10 8:11 | 41 |
| Tokugawa | biodata0003.* | 2019/2/1 10:10 | 2019/7/10 17:05 | 22 |
| Oda | biodata0001.* | 2019/2/1 8:36 | 2019/7/1 13:07 | 20 |
| Sakamoto | biodata0004.* | 2019/2/4 18:01 | 2019/7/2 20:43 | 19 |
| Yoshida | biodata0008.* | 2019/2/7 13:59 | 2019/7/4 16:19 | 17 |
| Toyotomi | biodata0002.* | 2019/2/1 8:44 | 2019/6/30 14:27 | 16 |
| Ito | biodata0007.* | 2019/2/7 12:36 | 2019/7/1 9:35 | 12 |

| USER IDENTIFI-CATION | FINGERPRINT | LAST UPDATE | LAST LOGIN | LOGIN COUNT | FLAG |
|---|---|---|---|---|---|
| Ito | biodata0007.* | 2019/2/7 12:36 | 2019/7/1 9:35 | 12 | 1 |
| Tokugawa | biodata0003.* | 2019/2/1 10:10 | 2019/7/10 17:05 | 22 | 0 |
| Ookubo | biodata0005.* | 2019/2/5 19:21 | 2019/7/10 8:11 | 41 | 0 |
| Saigo | biodata0006.* | 2019/2/7 8:12 | 2019/7/9 16:40 | 55 | 0 |
| Yoshida | biodata0008.* | 2019/2/7 13:59 | 2019/7/4 16:19 | 17 | 0 |
| Sakamoto | biodata0004.* | 2019/2/4 18:01 | 2019/7/2 20:43 | 19 | 0 |
| Oda | biodata0001.* | 2019/2/1 8:36 | 2019/7/1 13:07 | 20 | 0 |
| Toyotomi | biodata0002.* | 2019/2/1 8:44 | 2019/6/30 14:27 | 16 | 0 |

| USER IDENTIFI-CATION | FINGERPRINT | LAST UPDATE | LAST LOGIN | LOGIN COUNT | ATTEND-ANCE FLAG |
|---|---|---|---|---|---|
| Tokugawa | biodata0003.* | 2019/2/1 10:10 | 2019/7/10 17:05 | 22 | 1 |
| Saigo | biodata0006.* | 2019/2/7 8:12 | 2019/7/9 16:40 | 55 | 1 |
| Yoshida | biodata0008.* | 2019/2/7 13:59 | 2019/7/4 16:19 | 17 | 1 |
| Sakamoto | biodata0004.* | 2019/2/4 18:01 | 2019/7/2 20:43 | 19 | 1 |
| Ito | biodata0007.* | 2019/2/7 12:36 | 2019/7/1 9:35 | 12 | 1 |

| USER IDENTIFI-CATION | FINGERPRINT | LAST UPDATE | LAST LOGIN | LOGIN COUNT | ATTEND-ANCE FLAG |
|---|---|---|---|---|---|
| Saigo | biodata0006.* | 2019/2/7 8:12 | 2019/7/9 16:40 | 55 | 0 |
| Sakamoto | biodata0004.* | 2019/2/4 18:01 | 2019/7/2 20:43 | 19 | 0 |

IMAGE PROCESSING APPARATUS WITH BIOMETRIC AUTHENTICATION AND BIOMETRIC AUTHENTICATION METHOD FOR IMAGE PROCESSING APPARATUSES

CROSS-REFERENCE TO RELATED APPLICATIONS

This application is based upon and claims the benefit of priority from Japanese Patent Application No. 2019-230416, filed on Dec. 20, 2019, the entire contents of which are incorporated herein by reference.

FIELD

Embodiments described herein relate generally to an image processing apparatus and an authentication method.

BACKGROUND

An image processing apparatus capable of logging in by using biometric information of a user is known. The biometric information of the user is, for example, fingerprint information of the user, vein pattern information of the user, iris information of the user, user facial pattern information, or the like.

When a user (user A) attempts to log in to the image processing apparatus, the image processing apparatus reads biometric information from the user A. Biometric information for multiple users eligible for logging in to the image processing apparatus is stored in the image processing apparatus as reference biometric information. In general, the ordering of the different pieces of reference biometric information stored in the image processing apparatus is some predetermined order. Thus, the image processing apparatus reads the biometric information from user A and then attempts to match this biometric information to the reference biometric information one by one in the predetermined order. The image processing apparatus therefore repeatedly performs collation (matching analysis) of the acquired biometric information for each of the selected reference biometric information items in turn until a satisfactory match is made. In such a case, the collation must be repeatedly performed until a reference biometric information with a degree of matching (similarity) higher than some predetermined threshold is found.

However, in such an image processing apparatus, the predetermined order in which reference biometric information is stored or searched is not necessarily the order by which the collation process would be completed the fastest. For example, the predetermined order is often simply just the order (chronological order) in which the reference biometric information was stored in the image processing apparatus or another arbitrary ordering, such as alphabetical by user name or the like. For this reason, the time required for the collation or reference matching tends to become longer with increasing numbers of registered users. Also, the likelihood of coincidental or inadvertent initial matching to reference biometric information that is similar to (i.e., meets the predetermined similarity threshold) but still not the best match among all the stored reference biometric information increases. Therefore, the time required for user login via biometric information may be longer than desirable for an image processing apparatus.

BRIEF DESCRIPTION OF THE DRAWINGS

FIG. 4 is a user information table illustrating an example of a plurality of pieces of user information without any order change processing.

FIG. 5 is a user information table for which an order change process based on the last login information has been performed.

FIG. 6 is a user information table for which an order change process, based on login count information, has been performed.

FIG. 7 is a user information table for which an order change process based on user identification information has been performed.

FIG. 8 is a user information table for which an order change process based on an attendance flag has been performed.

FIG. 9 is a user information table for which an order change process based on a filtering of stored information based on some predetermined condition has been performed.

DETAILED DESCRIPTION

Figure 1:
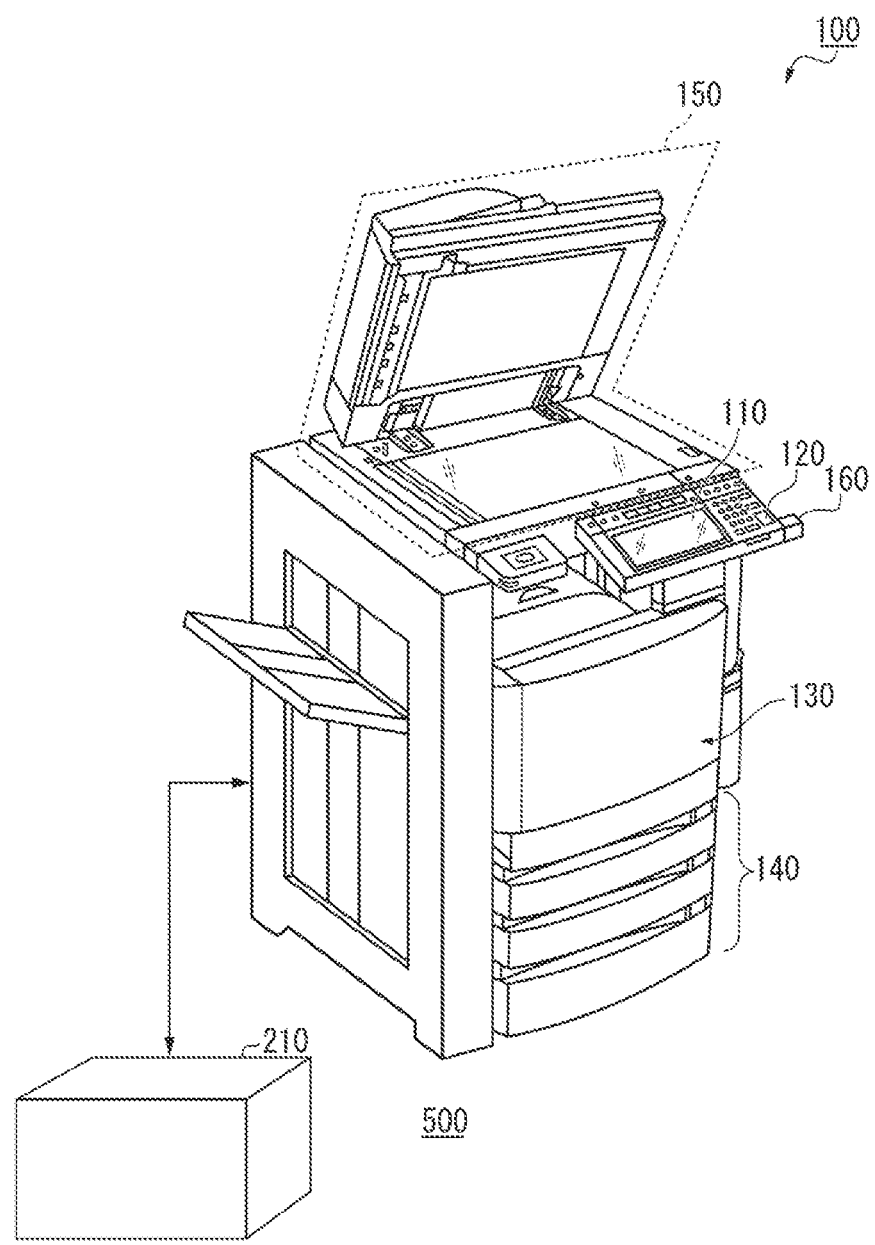
FIG. 1 is an external view of an image processing apparatus according to an embodiment.

Certain embodiments provide an image processing apparatus capable of suppressing increases in the time required for a user login.

According to one embodiment, an image processing apparatus includes an image processing unit and a controller. The controller receives biometric information for a user for a logon operation and re-orders user record entries in a table when a predetermined condition occurs. Each record entry in the table includes reference biometric information in association with various user information. The re-ordering of the entries is based on user information stored in the user record entries. After the re-ordering of the user record entries in the table, the controller performs an authentication operation that includes comparing the received biometric information to reference biometric information in the user record entries of the table.

Hereinafter, an image processing apparatus according to certain example embodiments will be described with reference to the drawings. These example embodiments are non-limiting examples. In the drawings, the same components are denoted by the same reference numerals. An image processing apparatus 100 will be described as one example embodiment.

In the following, for convenience of description, any user who is attempting to log in to the image processing apparatus 100 will be referred to as a first user. Each of the registered users who can log in to the image processing apparatus 100 will be referred to as a second user. That is, the second user is a user registered in the image processing apparatus 100 as a person eligible to use the image processing apparatus 100. When a first user is an eligible (registered) user of the image processing apparatus 100, the first user will be one of the second users. On the other hand, if the first user is not an eligible (registered) user, then such a user cannot log in to the image processing apparatus 100 because such a first user is not a second user.

In the following description, the process of authentication of a first user U1 by the image processing apparatus 100 will be referred to as authentication of the first user U1. The collation between the acquired biometric information of the first user U1 and the stored biometric information of a second user U2 will be referred to as a collation or comparison between the first user U1 and the second user U2. In this context, the biometric information may be fingerprint information, vein pattern information, iris pattern information, face information, or the like. In the described example embodiment, the biometric information of the users is fingerprint information. Therefore, the collation or comparison between the first user U1 and a second user U2 refers to a collation between the fingerprint information of the first user U1 and the fingerprint information of a second user U2.

Image Processing Apparatus

FIG. 1 is an external view illustrating an example of an overall configuration of the image processing apparatus 100 according to an embodiment. The image processing apparatus 100 is, for example, a device that performs image processing, such as a multifunction peripheral (MFP), a scanner, and a facsimile (FAX) machine, or the like. In this context, image processing is, for example, a process related to forming an image on a sheet, reading image information from a sheet, recording (or otherwise storing) image information, or transmitting an image to another apparatus.

The image processing apparatus 100 includes a display 110, a control panel 120, a printer unit 130, a sheet accommodation unit 140, an image reading unit 150, and a biometric information reading unit 160. The printer unit 130 may be a device for fixing a toner image to a sheet or may be an ink jet type device.

The image processing apparatus 100 reads an image from a sheet, generates digital data accordingly, and generates an image file. The sheet is, for example, a document or a paper on which text, imaged, or the like is provided. In general, the sheet may be any object as long as it can be read by the image processing apparatus 100.

The display 110 is an image display device such as a liquid crystal display, an organic EL (Electro Luminescence) display, or the like. The display 110 displays various kinds of information related to operations and functions of the image processing apparatus 100.

The control panel 120 includes a plurality of buttons. The control panel 120 receives an input operation performed by a user. The control panel 120 outputs a signal corresponding to the input operation performed by the user to a control unit 300 of the image processing apparatus 100. The display 110 and the control panel 120 may be configured as an integrated touch panel. The control panel 120 is an example of an operation receiving unit or a user input device.

The printer unit 130 forms an image on the sheet based on image information generated by the image reading unit 150 or image information received through a communication path, such as a network or device connection. The printer unit 130 forms an image by the following processing. An image forming unit of the printer unit 130 forms an electrostatic latent image on a photosensitive drum based on image information. The image forming unit of the printer unit 130 forms a visible image by attaching a developer to the electrostatic latent image. As a specific example of the developer, there is a toner. A transfer unit of the printer unit 130 transfers the visible image onto a sheet. A fixing unit of the printer unit 130 fixes the visible image to the sheet by heating and pressing the sheet. The sheet on which the image is formed may be a sheet from the sheet accommodation unit 140, or may be a sheet that has been manually inserted.

The sheet accommodation unit 140 stores a sheet to be used for image formation in the printer unit 130.

The image reading unit 150 reads the image information from a sheet as patterns of brightness and darkness of reflected light or the like. The image reading unit 150 records the read image information. The recorded image information may be transmitted to another information processing apparatus via a network. The recorded image information may be printed on the sheet by the printer unit 130.

The biometric information reading unit 160 acquires the biometric information of the first user. The biometric information of the first user will be referred to as first biometric information. In this example, the biometric information of the first user is fingerprint information from the first user. Therefore, the biometric information reading unit 160 reads a fingerprint from the first user as the first fingerprint information. In the present embodiment, the reading or acquisition of the first fingerprint information by the biometric information reading unit 160 means that the biometric information reader 160 itself generates the first fingerprint information on the basis of the fingerprint of the first user.

Since the biometric information reading unit 160 generates the first fingerprint information, the biometric information reading unit 160 includes, for example, an image capturing unit configured to capture a fingerprint of the first user. The biometric information reading unit 160 captures an image fingerprint of the first user with the image capturing unit. Then, the biometric information reading unit 160 generates the first fingerprint information based on the image obtained by the capturing of the fingerprint of the first user. For example, the biometric information reading unit 160 extracts various feature points from the image and generates information indicating the extracted feature points as the first fingerprint information. Any method for extracting a feature point from an image that is a known or developed method can be used in this context. Furthermore, in some examples, the biometric information reading unit 160 may be a device that simply captures a fingerprint of the first user. In such a case, the processing for extracting the feature point(s) from the image and the processing for generating the information indicating the extracted feature point as the first fingerprint information can be performed by, for example, the control unit 300 of the image processing apparatus 100. The processing for generating the first fingerprint information from may also or instead be performed by another apparatus. In such a case, the image processing apparatus 100 acquires the fingerprint information from the other apparatus rather than directly.

For convenience of description, formation of an image on a sheet by the printer unit 130, and formation of an image on a sheet by the image processing apparatus 100 will be referred to simply as printing.

The image processing apparatus 100 is communicatively connected to one or more other information processing apparatuses, such as a personal computer (PC), a server, or the like, via a network. In the example illustrated in FIG. 1, the image processing apparatus 100 is connected to the server 210. The image processing apparatus 100 may also be communicatively connected to another information processing apparatus in place of the server 210. In addition, the image processing apparatus 100 may be communicatively connected to another information processing apparatus in addition to the server 210.

The server 210 is a print server. In response to a request from another information processing apparatus communicatively connected to the server 210, the server 210 can store print data received from this other information processing apparatus. The print data can be information indicating an image to be formed on a sheet by an image processing apparatus 100 by printing. In response to a request from the image processing apparatus 100, the server 210 transmits the print data indicated by the request from among the one or more pieces of the stored print data to the image processing apparatus 100. Accordingly, the image processing apparatus 100 can print the image corresponding to the print data received from the server 210. The number of information processing apparatus connected to server 210 is not particularly limited. Likewise, more than one image processing apparatus may be connected to server 210.

In FIG. 1, the image processing apparatus 100 is depicted as part of an image processing system 500. The image processing system 500 includes an image processing apparatus 100, a server 210, and any information processing apparatuses communicatively connected to the image processing apparatus 100 or the server 210. In some examples, the image processing system 500 may not include the server 210. In addition, the image processing system 500 need not be configured to permit one or more information processing apparatuses communicatively connected to the image processing apparatus 100 or to the server 210.

(Functional Configuration of Image Processing Apparatus)

Figure 2:
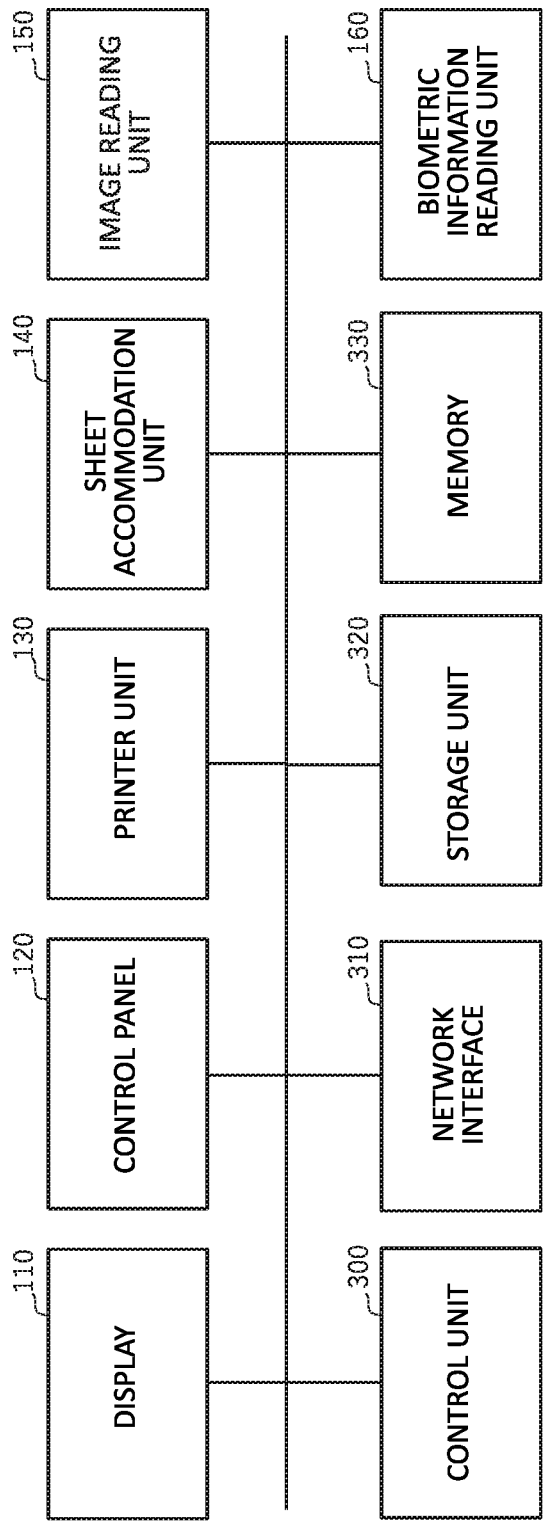
FIG. 2 is a diagram of a functional configuration of an image processing apparatus according to an embodiment.

FIG. 2 is a diagram illustrating an example of a functional configuration of the image processing apparatus 100.

The image processing apparatus 100 includes a display 110, a control panel 120, a printer unit 130, a sheet accommodation unit 140, an image reading unit 150, and a biometric information reading unit 160. Further, the image processing apparatus 100 includes a control unit 300, a network interface 310, a storage unit 320, and a memory 330. These units included in the image processing apparatus 100 are communicatively connected to each other via a system bus.

The display 110, the control panel 120, the printer unit 130, the sheet accommodation unit 140, the image reading unit 150, and the biometric information reading unit 160 were described above, in conjunction with FIG. 1, so further description will now be given for the control unit 300, the network interface 310, the storage unit 320 and the memory 330.

The storage unit 320 is, for example, an auxiliary storage device such as a hard disk, a solid state drive (SSD), or the like. The storage unit 320 stores various types of information. For example, the storage unit 320 stores a program to be executed by the control unit 300. The program is, for example, firmware, an application, or the like.

Further, the storage unit 320 stores the user information for each second user. In other words, the storage unit 320 has a user information entry for each of the plurality of second users. The different pieces of user information stored in the storage unit 320 can be referred to collectively as user information entries, a user information registry, a second user information registry, or the like, and each individual entry can be referred to as a user entry, a second user entry, a user information entry, a table entry, or the like. The information within each user entry may be referred to as entry pieces, sub-entry fields, sub-entry information, or the like.

The user information entry for each second user includes the biometric information of the second user. Here, in the present embodiment, as described above, the biometric information of the second user is the fingerprint information of the second user. For this reason, in the present embodiment, the user information entries of the second users includes the fingerprint information and other information for the second user associated with each other.

The other information for the second user can, in general, be any information related to the second user. The related information to the second user includes, for example, user identification information for identifying the second user, last login information of the second user, login count information of the second user, and the like. The second user identification information is, for example, a user ID (e.g., a unique identifier or name) of the second user or the like. The last login information is information indicating the last date and time when the second user logged in to the image processing apparatus 100. The login count information is information indicating the total number of times the second user has logged in to the image processing apparatus 100 in the past. The related information of the second user may include other information related to the second user instead of some or all of the last login information, and the login count information. In addition, the stored related information of the second user may include other information related to the second user, in addition to all of the last login information, and the login count information. The control unit 300 of the image processing apparatus 100 authenticates a first user based on the first biometric information read by the biometric information reading unit 160 and the second user information stored in the storage unit 320.

The control unit 300 is an example of a control unit or controller of the image processing apparatus 100. The control unit 300 includes a central processing unit (CPU) of the image processing apparatus 100. The control unit 300 controls the operation of each functional unit of the image processing apparatus 100. The control unit 300 executes one or more programs and executes various types of processing accordingly. The control unit 300 acquires an instruction input by the user from the control panel 120. That is, the control unit 300 receives an input operation from the user via the control panel 120. The control unit 300 executes the control processing on the basis of the acquired instruction.

Here, for purposes of comparison, an image processing apparatus different from the image processing apparatus 100, is discussed. An image processing apparatus capable of reading biometric information of a user in the same manner as the image processing apparatus 100 is known. Such an image processing apparatus reads the biometric information of the user who attempts to log in to the image processing apparatus. In addition, in the comparative image processing apparatus, biometric information for a plurality of users eligible for logging in to the image processing apparatus is stored as reference biometric information. A predetermined order is assigned to the stored plurality of pieces of reference biometric information. For this reason, after reads the biometric information for purposes of login, the comparative image processing apparatus, then selects the reference biometric information one by one in the assigned predetermined order and looks for a match. In general, the comparative image processing apparatus repeatedly performs matching analysis for each of the selected reference biometric information items in turn. In this comparative image processing apparatus, the collation is performed until reference biometric information having a determined similarity degree (degree of matching) greater than some predetermined threshold is found. However, in the comparative image processing apparatus, the predetermined order is not necessarily the order by which a match will be found most quickly. For example, the predetermined order is often the order in which the reference biometric information was stored in the image processing apparatus. For this reason, the time required for collation may be longer than necessary and poor matches may also result. As a result, in the comparative image processing apparatus, the time required for a user to log in may be longer than preferred.

Therefore, in the present embodiment, the control unit 300 performs an order change processing and an authentication processing. In this context, order change processing is a process of changing the ordering of the user information entries based on aspect of the stored related information when a predetermined condition is satisfied. The authentication processing is a process performed when the first biometric information is acquired. More specifically, the authentication processing is processing for authenticating a first user based on the acquired first biometric information and the stored second user information. This makes it possible for the time required for logging in to be shorter in most instances. The order change processing performed by the control unit 300 and the associated improvements in user logging in processing (authentication processing) performed by the control unit 300 will be described.

The network interface 310 transmits and receives data to and from other devices. The network interface 310 operates as an input interface, and receives data transmitted from another device. In addition, the network interface 310 operates as an output interface, and transmits data to another device.

The memory 330 is, for example, a random access memory (RAM). The memory 330 temporarily stores information used by the respective functional units included in the image processing apparatus 100. The memory 330 may store the image information read by the image reading unit 150, a program for operating each functional unit, and the like.

(Order Change Processing)

Figure 3:
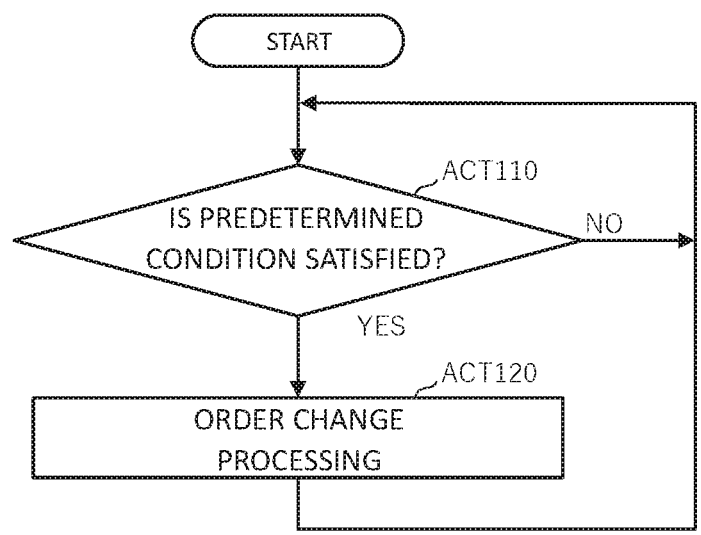
FIG. 3 is a diagram illustrating an example of a flow of an order change processing performed by a control unit.

FIG. 3 is a diagram illustrating an example of a flow of the order change processing performed by the control unit 300.

The control unit 300 waits until a predetermined condition is satisfied (ACT 110).

The predetermined condition can be one or more processing start conditions. Here, each of the processing start conditions included in the predetermined condition is associated with one of the one or more pieces of information included in the related information (sub-entry information). Once a certain processing start condition is satisfied, the control unit 300 performs the order change processing based on the information associated with the processing start condition. The particular aspects of order change processing based on particular information will be described below.

For example, the certain processing start condition is that at least one piece of last login information has been updated in a second user entry. Hereinafter, this processing start condition will be referred to as a first processing start condition.

For example, the certain processing start condition is that at least one piece of login count information has been updated in a second user entry. Hereinafter, this processing start condition will be referred to as a second processing start condition.

The predetermined condition may relate to other conditions as processing start conditions instead of one or both of the first processing start condition and the second processing start condition. In addition, the predetermined condition may be in addition to, or conditional on, the first processing start condition and/or the second processing start condition being satisfied.

In ACT 110, when at least one of the processing start conditions included in the predetermined condition is satisfied, the control unit 300 determines that the predetermined condition is satisfied.

When it is determined that the predetermined condition is satisfied (YES in ACT 110), the control unit 300 identifies one or more of the processing start conditions that are satisfied from among the processing start conditions included in the predetermined condition. Then, the control unit 300 performs an order change processing based on each of the information associated with the specified one or more process start conditions (ACT 120). Here, the processing in ACT 120 will be described.

For example, when the first processing start condition is specified as one of the processing start conditions for ACT 110 and is satisfied (YES in ACT 110), the control unit 300 performs the order change processing (ACT 120) based on the last login information. Here, the order change processing based on the last login information is processing for changing the order of the second user entries so as to be in descending order of the date and time (most recent to oldest) indicated by the last login information. In other words, the order change processing is processing for changing table T1 to table T2.

FIG. 4 is a table illustrating an example of a plurality of pieces of user information for which the order change processing has not been performed even once. The table T1 illustrated in FIG. 4 is a table store second user information entries. In addition, each entry (also referred to as a row, a row entry or record) in the table T1 stores various pieces of user information as column entries. Each column corresponding to a different type of user information (also referred to as sub-entry information).

When user information entries are stored in a table, as in the table T1, the order of the second user entries is indicated by the row order of the records (entries) listed in the table. That is, the row rank order of each record in the table T1 corresponds to the rank of the user information for each record. The order of the records in the table T1 is the order before order change processing in ACT 120 is performed. That is, the ordering of entries in the table T1 is the order that occurs without any intervention before the order change processing is performed. Note that, in some examples, the rank ordering of user information entries may be indicated by other formats that table order. For example, another format by which each sub-entry piece of user information can be assigned an individual rank, instead of the configuration indicated by the table T1, may be adopted.

In FIG. 4, each record (row entry) of the table T1, includes the user identification information, the fingerprint information, the last update information, the last login information, and the login count information. In this example, among these sub-entry pieces of information, the user identification information, the last update information, the last login information, and the login count information are included as the related information.

In the following, a second user identified by "Oda" will be referred to as a second user X1; a second user identified by "Toyotomi" will be referred to as a second user X2; a second user identified by "Tokugawa" will be referred to as a second user X3; a second user identified by "Sakamoto" will be referred to as a second user X4; a second user identified by "Ookubo" will be referred to as a second user X5; a second user identified by "Saigo" will be referred to as a second user X6; a second user identified by "Ito" will be referred to as a second user X7; and a second user identified by "Yoshida" will be referred to as a second user X8.

Here, in the table T1, individual records for each of the second users X1 to X8 are arranged in ascending order of the last update. In other words, in the table T1, records indicating the user information of the second users X1 to X8 are arranged in chronological order from the oldest update date to the most recent. Thus, if table T1 is used by the control unit 300 in authentication processing, then the control units selects the records for matching analysis from the table T1 one by one starting from the top row of the table T1 (that is, the entry for second user X1) and working downward towards the last row (that is, the entry for second user X8).

FIG. 5 is a diagram illustrating an example of the table T2, which corresponds to table T1 after the order change processing based on the last login information is performed. In the table T2, second user records are arranged in chronological order from the most recent to the oldest date and time indicated by the last login information. Thus, if the control unit 300 selects the records of the table T2 one by one, the control unit 300 selects the record for which the last login is most recent.

As described above, when the first processing start condition is specified as one of the processing start conditions and satisfied in ACT 110, the control unit 300 performs the order change processing based on the last login information.

Here, the second user records most recently logging in are selected first because is considered more like that such users are more likely to use the image processing apparatus 100 again.

In accordance with the flowchart illustrated in FIG. 3, the control unit 300 performs the order change processing based on the last login information every time the first processing start condition is satisfied. As a result, in the authentication processing, the control unit 300 can select the record in descending order of the last login from the table T2 after the order change processing is performed. Then, the control unit 300 can perform the matching between the second user and the first user starting with the most recent last login and working towards the oldest last login. That is, the image processing apparatus 100 can more quickly authenticate users who have most recently used the image processing apparatus 100. Such users are more likely to be high frequency users.

If the second processing start condition is specified as one of the processing start conditions and satisfied in ACT 110, the control unit 300 performs the order change processing based on the login count information. Here, the order change processing based on the login count information is processing for changing the order of second user records such that the number of times indicated by the login count information is in descending order. In other words, the order change processing is processing for changing the table T1 to table T3 shown in FIG. 6.

FIG. 6 is a diagram illustrating a case where the order change processing based on the login count information has been performed on the second user records in table T1. In FIG. 6, the second user records are arranged in descending order of the login count information. Thus, if the control unit 300 selects the records from the table T3 one by one (starting with the first row and working downward), the control unit 300 select the records of second users which are the most frequent users to the least frequent users of the image processing apparatus 100.

A second user with a high login count is considered to be highly likely to use the image processing apparatus 100 again. As indicated by flowchart illustrated in FIG. 3, the control unit 300 can perform the order change processing based on the login count information every time the second processing start condition is satisfied. As a result, in the authentication processing, the control unit 300 can selects the records in descending order of the number of logins from the table T3 after the order change processing has been performed. Then, the control unit 300 can perform the collation between the second users and the first user in descending order of the number of logins. That is, the image processing apparatus 100 can reduce match times for users having a high number of logins, which is considered to correspond to a high frequency user.

As described above, the predetermined condition may be a configuration in which the other processing start conditions are included in addition to the first processing start condition and/or the second processing start condition. For example, the predetermined condition may be a configuration in which a third processing start condition is included as the predetermined condition. In this context, the third processing start condition can be that the user identification information has been received from another apparatus along with print data. The other apparatus is, for example, a PC, a server, or the like, but is not limited thereto.

The third processing start condition relates to the user identification information. When the third processing start condition is specified as one of the processing start conditions satisfied in ACT 110, the control unit 300 performs the order change processing based on the user identification information. Here, the order change processing is processing for changing the order of the second user entries such that the ranking considers the reception of user identification information as part of print job from another device. Such the second user entry corresponding to the received user identification information can be moved to a predetermined rank order position. In other words, the order change processing is, for example, processing for changing the table T1 to Table T4, illustrated in FIG. 7. The predetermined rank order position may be any rank order position within the second user registry, but here, as an example, a case in which the predetermined rank order position is the first entry in the second user table will be described.

FIG. 7 is a diagram illustrating an example of a table T1 where order change processing based on the reception of user identification information has been performed. FIG. 7 illustrates a table T4 for which a second user identified by the control unit 300 as having user identification information corresponding to that received along with print data has been moved to the first row (first rank). In this example, the second user X7 is the second user having user identification information corresponding to a received print job. As a result, when the control unit 300 selects records from the table T4, the control unit 300 will first select the record of second user X7.

Here, the control unit 300, for example, performs the order change processing based on reception of print data along with user identification information, prior to printing based on the received print data. In this example, control unit 300 receives first user identification information for identifying a first user U1 together with print data from a PC operated by the first user U1. In this case, since the third processing start condition is satisfied, the control unit 300 determines that a predetermined condition is satisfied. Then, the control unit 300 performs the order change processing based on the received first user identification information, and changes the order of the plurality of pieces of user information. Accordingly, the control unit 300 changes the rank of the second user entry corresponding to (that is, having the same user identification information as) the first user U1 to the first row in the second user table. Then, later, when the first user U1 performs an operation for logging in to the image processing apparatus 100, the control unit 300 reads the first biometric information of the first user U1 by the biometric information reading unit 160.

The image processing apparatus 100 authenticates the first user U1 based on the first biometric information read from the table. Thus, the control unit 300 can shorten the time required for the authentication of the first user U1. When the login of the first user U1 is permitted by the authentication processing, the first user U1 can then perform an operation for causing the image processing apparatus 100 to perform printing of the print data received by the control unit 300. Accordingly, the control unit 300 causes the printer unit 130 to perform the printing based on the received print data.

The control unit 300 thus performs order change processing based on the user identification information, reception of print data, and printing based on the received print data according to the following processing example. The first user U1 transmits the first user identification information for identifying the first user U1 together with the print data from a PC operated by the first user U1 to the server 210. The server 210 transmits the received first user identification information to the image processing apparatus 100. As a result, the control unit 300 receives the first user identification information. In this case, since the third processing start condition is satisfied, the control unit 300 determines that a predetermined condition is satisfied. Then, the control unit 300 performs the order change processing based on the received first user identification information, and changes the order of the second user table. Accordingly, the control unit 300 changes the rank of the second user corresponding to the first user U1 to the first position (row) in the table. Then, the first user U1 performs an operation for logging in to the image processing apparatus 100 to the image processing apparatus 100. Accordingly, the control unit 300 reads the first biometric information of the first user U1 by the biometric information reading unit 160. The control unit 300 authenticates the first user U1 based on the read first biometric information and the re-ordered second user table. In this authentication, the control unit 300 performs the collation between the first user U1 and the second user by using a second user table in which the rank of the entry corresponding to the first user U1 has been changed to the first position. Thus, the image processing apparatus 100 can shorten the time required for authentication processing of first user U1. After the login of the first user U1 is permitted by the authentication, the first user U1 performs an operation of causing the image processing apparatus 100 to perform printing of the print data received by the server 210 to the image processing apparatus 100. That is, the control unit 300 receives the print data from the server 210 in accordance with the accepted operation of an authenticated user. Then, the control unit 300 causes the printer unit 130 to perform the printing on the basis of the received print data.

In addition, the predetermined condition may include a configuration in which the first processing start condition is included in addition to the second processing start condition and a fourth processing start condition. In this context, the fourth processing start condition is a change in an attendance state of a second user. The attendance state of a second user indicates whether the worker corresponding to the second user is presently working (or scheduled as such) or not presently working (or at least not scheduled to be working). That is, the change in the attendance state of the second user means that the second user changes from the working state to the off state.

When the fourth processing start condition is included in the predetermined condition(s), the control unit 300 acquires the attendance information indicating the attendance state of the second users from another apparatus. For example, in this case, the control unit 300 is communicatively connected to a management server that tracks the attendance of the second user. The control unit 300 acquires the attendance information from the management server. Based on the acquired attendance information, the control unit 300 modifies a value of an attendance flag of each record to indicate the attendance state of the second users. For example, the attendance flag value indicating the state where the second user is presently working is "1". The attendance flag value indicating the second user is not presently working is "0".

The fourth processing start condition is associated with the attendance flag values. When the fourth processing start condition is specified as one of the processing start conditions and is satisfied in ACT 110, the image processing apparatus 100 performs the order change processing based on the attendance flag. Here, the order change processing based on the attendance flag is a processing in which the order is changed such that the rank of the second users having the attendance flag "1" is made higher than any second user with the attendance flag "0". In other words, the order change processing by which table T1 is changed to Table T5 shown in FIG. 8.

As shown in FIG. 8, in the table T5, an attendance flag has been added to each second record as a sub-entry field. In FIG. 8, only thus second user records having an attendance flag of "1" are illustrated. The second user records with an attendance flag of "0" are excluded from table T5, but this does not indicate such users would necessarily be unable to log on, rather just the would be after any second users with attendance flag "1" in rank.

Here, it is considered a second user with the attendance flag of "0" is less likely to log in to the image processing apparatus 100. In other words, a second user of the record having the attendance flag of "1" is presumably more likely to log in to the image processing apparatus 100 than a second user having the attendance flag of "0". Therefore, according to the flowchart illustrated in FIG. 3, the control unit 300 performs the order change processing on the basis of the attendance flag whenever the fourth processing start condition is satisfied. That is, the image processing apparatus 100 can reduce login times for those users scheduled or otherwise known to be working.

The order change processing based on the attendance flag may be a processing for extracting the user information with the attendance flag "1" from among the plurality of pieces of user information. This is because the extraction is a process of changing the order of the user information in a broad sense.

In addition, the predetermined condition may include a configuration in which the first processing start condition is included in addition to the second processing start condition and a fifth processing start condition. The fifth processing start condition relates to the image processing apparatus 100 accepting information indicating at least a part of the first user identification information then use such part of the information to filter and/or reorder the second user table. Hereinafter, for convenience of description, the information indicating at least part of the first user identification will be referred to as contained information. For example, when the first user identification information is "abc," then the contained information corresponds to any one of "a", "b", "c", "ab", "bc", and "abc". The contained information may also be referred to as information corresponding to at least a part of the user identification information of a second user record.

When the fifth processing start condition is specified as one of the processing start conditions and is satisfied in ACT 110, the image processing apparatus 100 performs the order change processing based on the contained information. Here, the order change processing based on the contained information is a processing by which the rank of the second user information is established by reference to the content of the user identification information. When user identification information of a second user record matches (or partially matches) the contained information, such matching second user record is ranked higher than second user records which do not have user identification information that matches (or partially matches) the contained information. In other words, the order change processing is processing for changing the table T1 to Table T6 shown in FIG. 9.

FIG. 9 illustrates, as an example, a table T6 in a case where the contained information is "S". In FIG. 9, only those records with user identification information that matches or partially matches with "S" is shown for simplification of the drawing. That is, in this case, the control unit 300 preferentially selects second user records that match (or partially match) the contained information. Thus, the image processing apparatus 100 can reduce the time required for the login of a user who has input the contained information to the image processing apparatus 100.

Here, the control unit 300 performs the reception of the contained information and also the change processing based on the received contained information. When the first user U1 logs in to the image processing apparatus 100, the control unit 300 receives the contained information together with the operation of logging in to the image processing apparatus 100 via the control panel 120. In this case, since the fifth processing start condition is satisfied, the control unit 300 determines that a predetermined condition is satisfied. Then, the control unit 300 performs the order change processing based on the received contained information, and changes the rank order of the second user records in view of the contained information. That is, the control unit 300 changes the order of the second user records such that the rank of the second user records with user identification information that matches or partially matches the received contained information is higher than those that do not. That is, the control unit 300 changes the table T1 to the table T6 in FIG. 9 by the order change processing based on the contained information.

Here, the contained information of the first user U1 is received by the image processing apparatus 100 immediately before the first user U1 logs in to the image processing apparatus 100. For this reason, each time the fifth processing start condition is satisfied, the control unit 300 performs the order change processing based on the contained information. As a result, the time required for the login of the first user who has input the contained information to the image processing apparatus 100 becomes shorter.

The order change processing based on the contained information may be a processing for extracting user information including user identification information that matches or partially matches the contained information. This is because the extraction is a process of changing the order of the user information in a broad sense.

As described above, when the control unit 300 determines that the predetermined condition is satisfied in ACT 110, the control unit 101 specifies one or more satisfied processing start conditions among the processing start conditions included in the predetermined condition. Then, the control unit 300 performs the order change processing based on the information associated with each of the specified one or more processing start conditions, in ACT 120. The control unit 300 may perform the order change processing based on some or all of the last login information, the login count information, the user identification information, the attendance flag, and the contained information in ACT 120. In other words, the predetermined condition may be a configuration in which some or all of the first processing start condition to the fifth processing start condition are included in the predetermined condition.

After the processing in ACT 120 is performed, the control unit 300 transitions to ACT 110, and waits until a predetermined condition is satisfied.

(Authentication Processing for Performing Control Unit)

Figure 10:
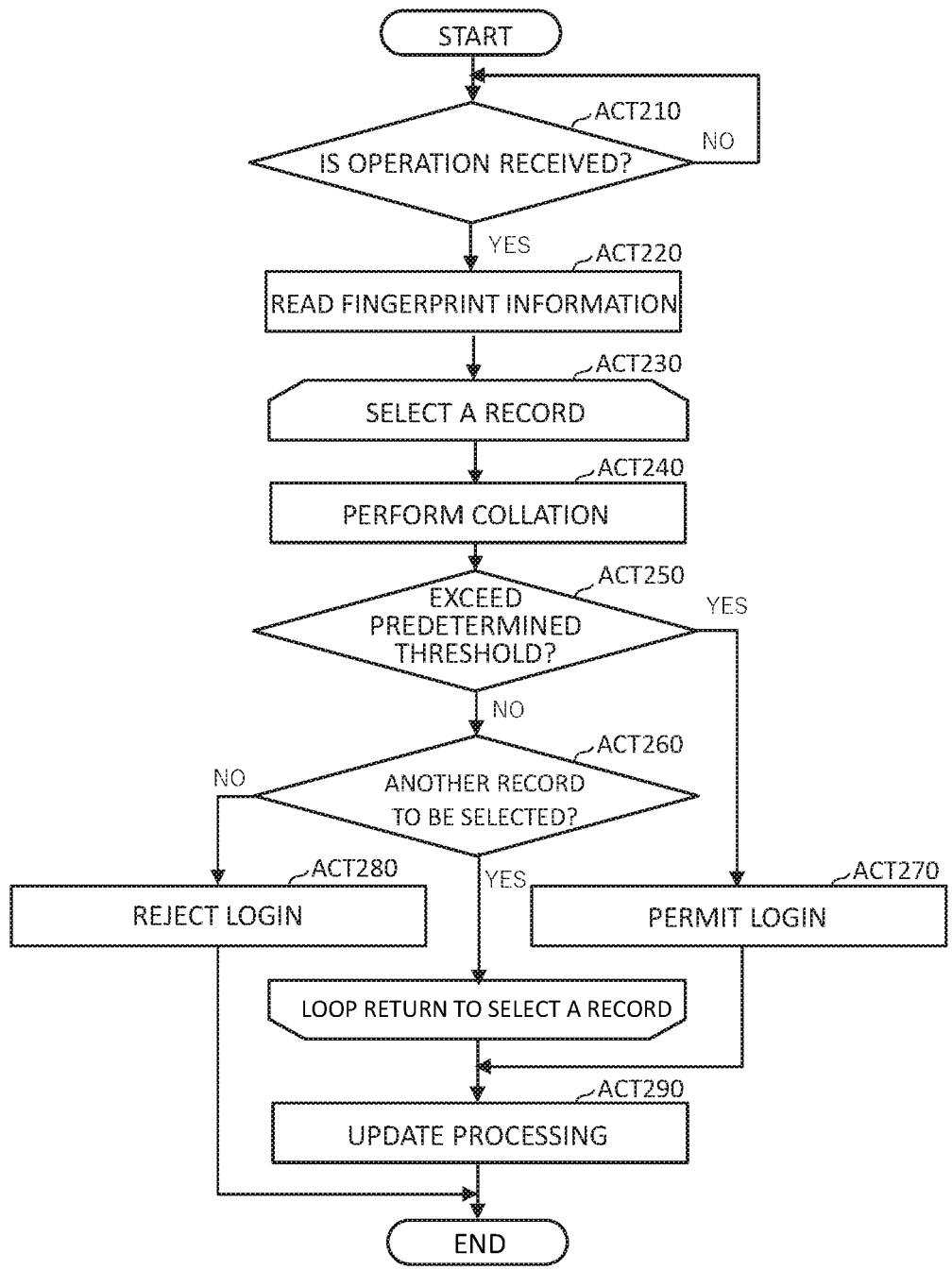
FIG. 10 depicts a flow of authentication processing performed by a control unit.

Hereinafter, an authentication processing performed by the control unit 300 will be described with reference to FIG. 10. FIG. 10 is a diagram illustrating an example of a flow of an authentication processing performed by the control unit 300. Hereinafter, as an example, a description will be given of a case where the order change processing is performed before the processing in ACT 210 is performed.

The control unit 300 waits until an operation for logging in to the image processing apparatus 100 is received from the first user via the control panel 120 (ACT 210).

When it is determined that the operation of logging in to the image processing apparatus 100 has been received from the first user (YES in ACT 210), the control unit 300 waits until a preparation for reading the fingerprint information is completed. Here, the preparation is that the first user places a finger in a position that can be imaged by the image capturing unit included in the biometric information reading unit 160. For example, the control unit 300 specifies that the preparation is completed by an operation received via the control panel 120. If it is determined that the preparation is completed, the control unit 300 reads the fingerprint information of the first user (ACT 220). The method of starting the reading of the fingerprint information by the biometric information reading unit 160 in ACT 220 may be another method.

Next, the control unit 300 selects a record from a second user table one by one from the top of the table. (ACT 230) The control unit 300 repeatedly performs the processing in ACT 240 to ACT 280 until each second user record has been selected from the table or a matching second user record has been identified.

After selecting a record in ACT 230, the control unit 300 performs collation (ACT 240) between the first user of the selected second user record on the basis of the fingerprint information read in ACT 220.

In the collation performed in ACT 240, the control unit 300 determines a degree of coincidence (similarity) between the fingerprint information of the first user and the fingerprint information of the second user record. The method of calculating the degree of coincidence by the control unit 300 may be any known or developed method If it is the degree of coincidence between the fingerprint information of the first user and the fingerprint information of the second user record has exceeded the predetermined threshold (ACT 250—YES), the control unit 300 permits the second user to log in to the image processing apparatus 100 (ACT 270). Then, the control unit 300 performs an update processing for updating the last login information and the login count information of the table storing the second user information (ACT 290), and ends the processing.

On the other hand, when the control unit 300 determines that the degree of coincidence between the fingerprint information of the first user and the fingerprint information of the second user record does not exceed the predetermined threshold (ACT 250—NO), the control unit 101 performs the following processing. The control unit 300 determines whether there is a second user record that has not yet been selected (ACT 260).

If it is determined that there is an unselected record (YES in ACT 260), the control unit 300 returns to ACT 230, and selects the next record from the table.

On the other hand, if it is determined that there is no unselected record (NO in ACT 260), the control unit 300 rejects the login of the first user 100 (ACT 280), and ends the processing.

As described above, the control unit 300 performs the authentication processing. In the authentication processing, when the order change processing is performed in advance on the second user table, the control unit 300 can prevent the login time for the first user from being long.

Modification of Embodiment

Figure 11:
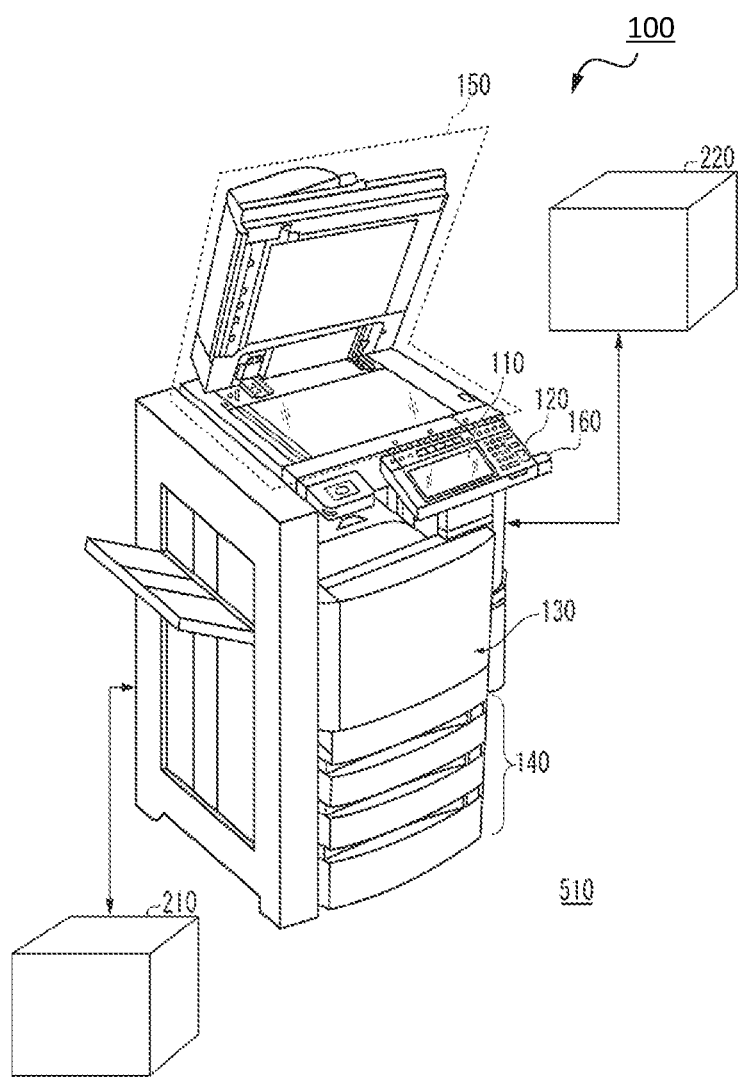
FIG. 11 is an external view of an image processing apparatus according to a modified example.

FIG. 11 is an external view illustrating an overall configuration example of an image processing apparatus 100 according to a modification of the embodiment. In the example illustrated in FIG. 11, the image processing apparatus 100 is communicatively connected to the server 210 in addition to the server 220.

The server 220 is an authentication server that performs an authentication of the first user. That is, in this modification, the server 220 performs the order change processing and the authentication processing instead of the image processing apparatus 100. In this case, the second user records are stored in the server 220. When the biometric information reading unit 160 reads fingerprint information of the first user, the image processing apparatus 100 transmits the read fingerprint information to the server 220. Accordingly, the server 220 otherwise performs authentication processing as described above. The server 220 also determines whether or not a predetermined condition is satisfied. Accordingly, the server 220 performs the order change processing as described above. The server 220 may have a configuration in which the management server 210 described above is connected thereto directly.

In FIG. 11, the image processing apparatus 100 is part of an image processing system 510. The image processing system 510 includes an image processing apparatus 100, a server 210, a server 220, and at least one other information processing apparatuses communicatively connected to the image processing apparatus 100, the server 210, and/or the server 220. The server 210 may also be communicatively connected to the server 220 and at least one information processing apparatus. The image processing system 510 may have a configuration in which only server 220 is provided.

As noted above, the biometric information reading unit 160 may be separate from the image processing apparatus. Thus, the image processing apparatus 100 may include the biometric information reading unit 160 therein or as an integrated component thereof, or the biometric information reading unit 160 may be a standalone device, an attachment, or the like.

As described above, the image processing apparatus 100 includes the storage unit 320 and the control unit 300. The storage unit stores, for each of a plurality of users, the user information including the information associated with the biometric information (the fingerprint information in this example). When a predetermined condition is satisfied, an authentication process for authenticating the first user is performed based on the acquired first biometric information and the plurality of pieces of stored user information, however, the ordering of the stored user information is changed based on some aspect of the stored information. This makes it possible for the image processing apparatus 100 to prevent reduce the login times of users overall.

A software program or the like for realizing the above-described functions of any component unit or device (for example, the image processing apparatus 100, the server 210, the server 220, and the like) may be recorded in a non-transitory computer-readable recording medium, and such a program may be read and executed by a computer system. Note that a "computer system" herein includes hardware, an operating system (OS), and a peripheral device. In this context, "computer-readable recording medium" refers to a portable medium such as a flexible disk, a magneto-optical disk, a ROM, or a compact disk (CD)-ROM, and a storage device such as a hard disk built in the computer system. Furthermore, in some examples, the computer-readable recording medium may be a networked computer, a cloud-based apparatus, server, or the like and the relevant program(s) can be downloaded and/or executed via a network such as the Internet or a communication line such as a telephone line.

The program(s) described above may be a program for realizing a part of the above-described functions. Further, the above program may be a so-called differential file (differential program) capable of realizing the above-described function in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
an image processing unit; and
a controller configured to:
  maintain a table including user record entries, each record entry including reference biometric information in association with a user identification, a last update time, and a last login time;
  receive biometric information for a user for a logon operation;
  re-order user record entries in the table when a predetermined condition is satisfied; and
  perform an authentication operation after the re-ordering of user record entries in the table, the authentication operation including comparing the received biometric information to reference biometric information in user record entries in the table.

2. The image processing apparatus according to claim 1, further comprising:
a storage unit for storing the table.

3. The image processing apparatus according to claim 1, wherein the predetermined condition is a change being made to the last update time of a user record entry in the table.

4. The image processing apparatus according to claim 1, wherein
the predetermined condition is receiving a print job associated with a user identification corresponding to a user identification in a user record entry stored in the table.

5. The image processing apparatus according to claim 1, wherein the last login time is the last time and date of a logon operation for a user associated with the user record entry.

6. The image processing apparatus according to claim 1, wherein each user record entry in the table includes login count information indicating how many times a user associated with the user record entry has logged on in the past.

7. The image processing apparatus according to claim 1, wherein each user record entry includes an attendance flag value indicating whether or not a user associated with the user record entry is at work.

8. The image processing apparatus according to claim 1, wherein
the predetermined condition is receiving a portion of a user identification input by the user in the logon operation, and
the re-ordering of user record entries in the table is based on a comparison of the portion of the user identification input by user in the logon operation to the user identifications contained in the user record entries.

9. The image processing apparatus according to claim 1, further comprising:
a network interface communicatively connected to a server.

10. The image processing apparatus according to claim 1, wherein the image processing unit comprises at least one of a printer unit, a document scanner, and a facsimile machine.

11. The image processing apparatus according to claim 1, further comprising:
a biometric information reader configured to provide the biometric information of the user for the logon operation.

12. An image processing system, comprising:
an image processing apparatus; and
a server communicatively connected to the image processing apparatus, wherein the image processing apparatus or the server includes a controller configured to:
maintain a table including user record entries, each record entry including reference biometric information in association with a user identification, a last update time, and a last login time;
receive biometric information for a user for a logon operation;
re-order user record entries in the table when a predetermined condition is satisfied; and
perform an authentication operation after the re-ordering of user record entries in the table, the authentication operation including comparing the received biometric information to reference biometric information in user record entries in the table.

13. The image processing system according to claim 12, wherein the controller is in the image processing apparatus.

14. The image processing system according to claim 12, wherein the controller is in the server.

15. The image processing system according to claim 12, wherein the predetermined condition is a change being made to the last update time of a user record entry in the table.

16. The image processing system according to claim 12, wherein
the predetermined condition is receiving a print job associated with a user identification corresponding to a user identification in a user record entry stored in the table.

17. The image processing system according to claim 12, wherein the last login time is the last time and date of a logon operation for a user associated with the user record entry.

18. The image processing system according to claim 12, wherein each user record entry in the table includes login count information indicating how many times a user associated with the user record entry has logged on in the past.

19. The image processing system according to claim 12, wherein each user record entry includes an attendance flag value indicating whether or not a user associated with the user record entry is at work.

20. An authentication method for an image processing apparatus, the authentication method comprising:
maintaining a table including user record entries, each record entry including reference biometric information in association with a user identification, a last update time, and a last login time;
receiving biometric information for a user for a logon operation;
re-ordering user record entries in the table when a predetermined condition is satisfied; and
performing an authentication operation after the re-ordering of user record entries in the table, the authentication operation including comparing the received biometric information to reference biometric information in user record entries in the table.

\* \* \* \* \*